United States Patent [19]

Kenny et al.

[11] Patent Number: 4,541,530
[45] Date of Patent: Sep. 17, 1985

[54] RECOVERY OF METALLIC CONCENTRATE FROM SOLID WASTE

[75] Inventors: Garry R. Kenny, College Grove; Edward J. Sommer, Jr.; Mark E. Shepard, both of Nashville, all of Tenn.

[73] Assignee: Magnetic Separation Systems, Inc., Nashville, Tenn.

[21] Appl. No.: 397,559

[22] Filed: Jul. 12, 1982

[51] Int. Cl.⁴ .............................................. B07C 5/344
[52] U.S. Cl. .................................. 209/571; 209/555; 209/930; 324/233
[58] Field of Search ..................... 209/555–558, 209/559, 567, 636, 639, 930, 571, 562, 563, 564, 3.1, 570; 331/DIG. 2; 324/233

[56] References Cited

U.S. PATENT DOCUMENTS

| | | | |
|---|---|---|---|
| 3,216,567 | 11/1965 | Kelly et al. | 209/639 |
| 3,650,396 | 3/1972 | Gillespie et al. | 209/930 |
| 3,701,419 | 10/1972 | Hutter et al. | 209/567 |
| 4,069,145 | 1/1978 | Sommer, Jr. et al. | 209/930 |
| 4,263,551 | 4/1981 | Gregory et al. | 324/233 |
| 4,345,679 | 8/1982 | De Woolfson | 194/4 C |
| 4,486,713 | 12/1984 | Gifford | 324/233 |

FOREIGN PATENT DOCUMENTS 197709 9/1977 U.S.S.R. ............................ 324/233

Primary Examiner—Randolph Reese
Assistant Examiner—Donald T. Hajec
Attorney, Agent, or Firm—Abe Hatcher

[57] ABSTRACT

Separation of metallic particles from non-metallic particles of processed solid waste such as garbage to obtain a metallic concentrate, including use of such separation as the mid-step in a process which begins with homogenizing and magnetically treating components of the waste and ends with isolating the metallic concentrate as a high-purity metal fraction, for example, high-purity aluminum.

1 Claim, 3 Drawing Figures

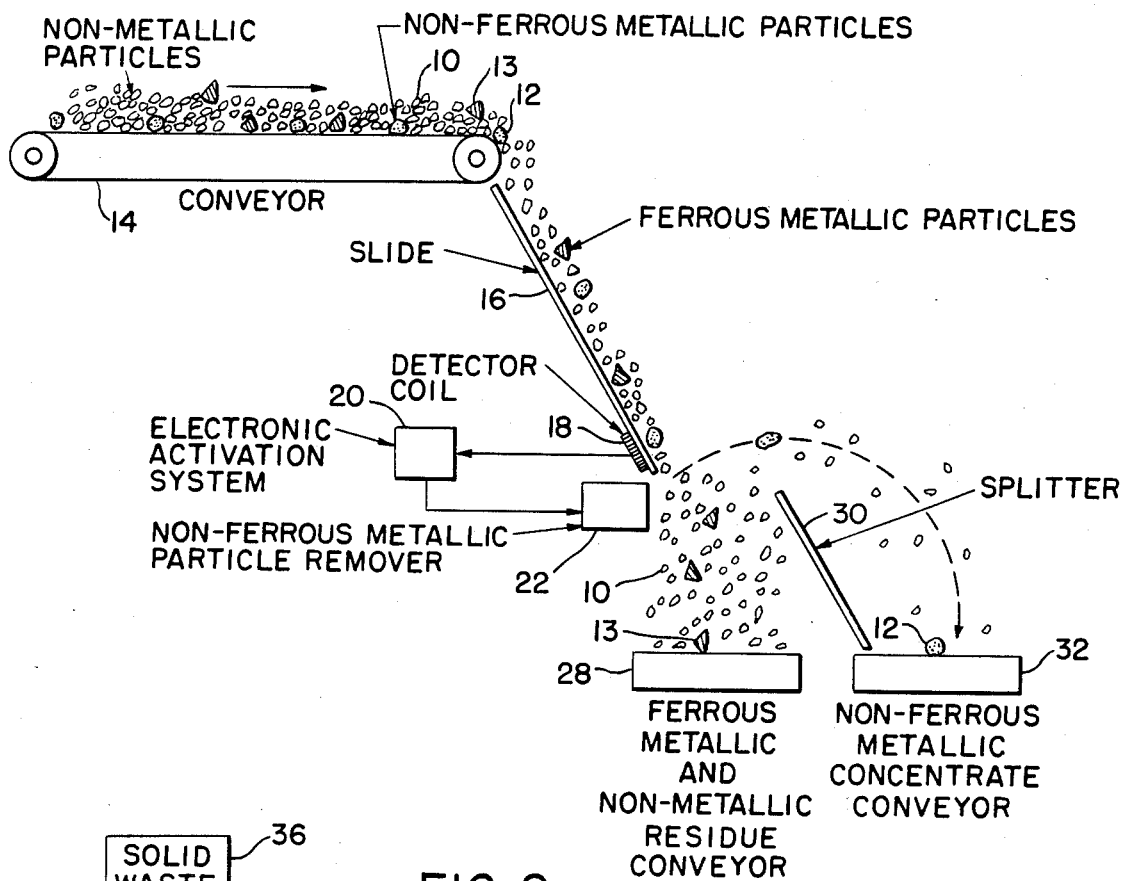
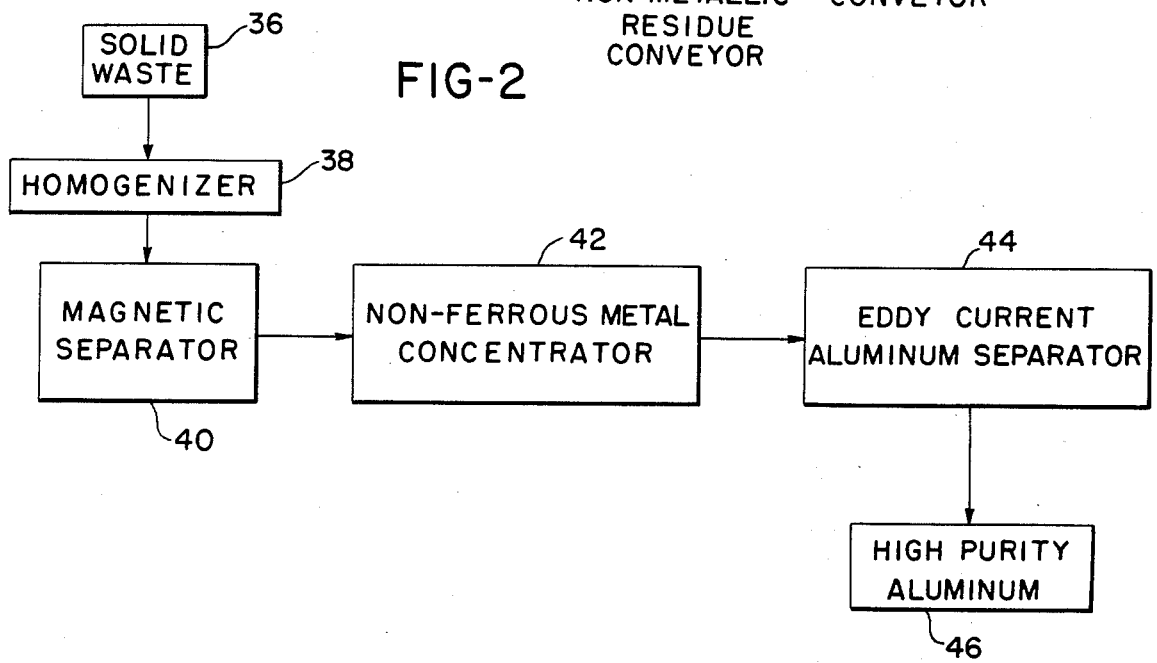

RECOVERY OF METALLIC CONCENTRATE FROM SOLID WASTE

BACKGROUND OF THE INVENTION

1. Field of the Invention

This invention relates to treatment of solid waste such as garbage. More particularly, it relates to concentration of a metallic fraction of the waste, preferably followed by recovery in high purity form, for example, as high-purity aluminum.

2. Description of the Prior Art

Heretofore solid waste material treatment systems have, in general, involved a series of metal and glass separation steps after shredding and air classification or the like. There has been no simple method to recover a metal conscentrate from the waste, especially as high-purity aluminum.

SUMMARY OF THE INVENTION

After extended investigation we have found that by electrically detecting metallic particles and employing an electronic activation system, we can separate either ferrous or non-ferrous metallic particles from non-metallic particles by employing a pneumatic system or by using a mechanical system such as a solenoid or trap-door arrangement to obtain a metallic concentrate and leave a non-metallic residue. High-purity aluminum may then be isolated by a separation process such as that of our U.S. Pat. No. 4,069,145. Before separating particles as aforesaid we preferably employ on the solid waste material a homogenizing step followed by a magnetic separation step in which most ferrous content is removed. The homogenizing may be by shredding, flail milling, mixing or screening, or the like.

According to our separation process we use a detection system coupled with the abovementioned mechanical or pneumatic extraction, thereby obtaining a metallic concentrate from a stream which may also contain ferrous material and non-metallic material.

Our preferred detection circuit as depicted in FIG. 3 of the drawing described hereinbelow is made up of a phase-lock loop (PLL) 50, detector coil drive circuit 52, detector coil 54 and output frequency filter 56 and time delay circuit 60. The PLL circuit and coil circuit form a feedback loop which enables the coil to be driven at the natural electrical resonant frequency of the detector coil inductance and a parallel tank circuit capacitance. This detection circuit is self-adjusting and immune to circuit electrical detuning caused by normal temperature induced component value variation.

As the value of the coil inductance changes due to proximity of an electrical conductor, the operating frequency of the PLL circuit changes to follow the natural tank frequency. During the frequency change interval the PLL circuit produces an error signal which is amplified at 58 and high pass filtered at 56 of FIG. 3 of the drawing referred to hereinabove and described more specifically hereinbelow. This signal is used to activate an air valve, as will be explained in greater detail hereinafter. Since the error signal is A.C. coupled to the air valve, slow changes in the tank and PLL frequency due to thermal drift of the circuit, component values may be rejected by the electrical filter. Additionally, since only rapid changes in frequency are allowed to activate the air valve, proximity of stationary electrical conductors (such as the air valve) does not significantly reduce the sensitivity of the detection system. The sensitivity of the detection circuit is sufficient to reliably detect aluminum cans 8 inches from the face of a slide which supports a number of detector coils.

Ferromagnetic materials such as steel and iron increase the inductance of the detection coil as they approach its position. Non-ferrous conductors such as aluminum, zinc and copper lower the inductance of the detection coil, thus raising the natural frequency of the coil/capacitor tank. This is due to eddy current effect. The PLL error signal changes polarity for increasing frequency as opposed to decreasing frequency. Thus, the detection system may be made to distinguish between ferrous and non-ferrous conductors of similar size. By proper filtering of the PLL error signal, the air valve may be actuated selectively to extract either ferrous or non-ferrous material. This allows the system of the invention to concentrate primarily non-ferrous conductors from a feed stream containing a majority of ferrous conductors.

A time dleay circuit may be imposed between the detection circuit output and the air valve input when the detector coil and air nozzle are not located at the same position. In such case the detection coil is located upstream from the air valve, and its output is time-delayed to allow for the transit time of the detected object from the detection coil to the air nozzle.

DESCRIPTION OF THE DRAWING

For a better understanding of our invention reference will now be made to the drawing.

In the drawing,

FIG. 1 is a schematic depiction in semi-flowsheet form of the metal concentration process of the invention.

FIG. 2 is a flowsheet showing a representative metal concentration process according to the invention in which the metal concentration portion is a non-ferrous metal concentration step of a multi-step separation-concentration process.

Figure 3:
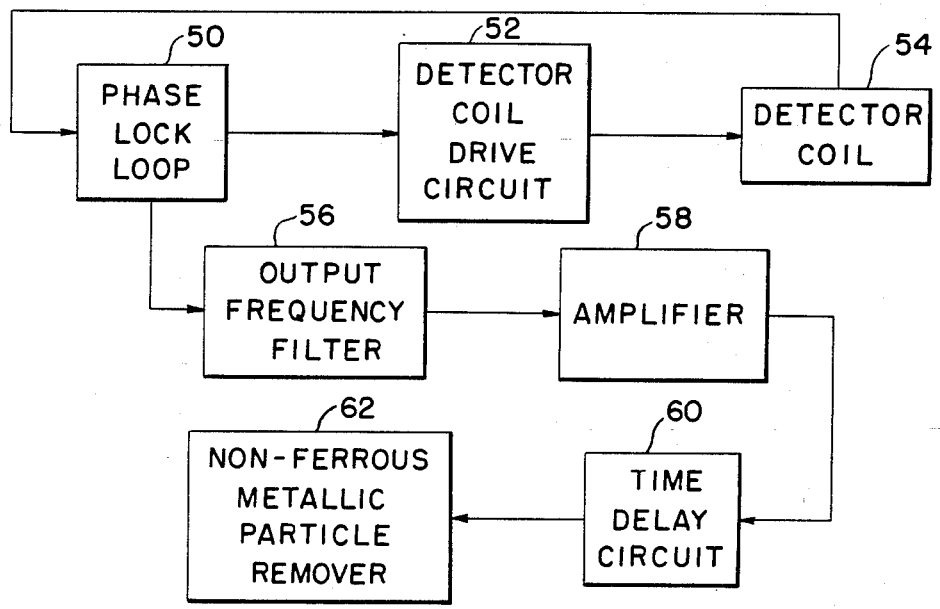
FIG. 3 is a block diagram showing a phase-lock loop detection circuit such as described hereinabove.

In the drawing, which is illustrative of the invention, in FIG. 1 solid waste in the form of non-metallic particles 10, ferrous metallic particles 13 and non-ferrous metallic particles or agglomerates or masses 12 are conducted along conveyor 14 and then down slide 16 until they pass in the vicinity of detector coil or coils 18, the detector coil or coils being in association with an electronic activation system 20 which activates a particle remover 22, 62, preferably pneumatic but which may be mechanical according to another embodiment of the invention. If pneumatic, the remover 22 may be made up of an air supply line which conducts air to an air valve and jet-type spray unit which causes most of the non-ferrous metallic particles 12 to fall into or onto a metallic concentrate conveyor 32 along with a relatively small number of non-metallic particles 10, with most of the non-metallic particles 10 falling onto a non-metallic residue conveyor 28, which is separated from the metallic concentrate conveyor 32 by a spliter 30.

In FIG. 2, solid waste 36 is first processed by a homogenizer 38 and then conducted into a magnetic separator 40 in which ferrous particles are magnetically separated from non-electrically conductive and non-ferrous particles. A mixture of non-metallic particles and non-ferrous metallic particles is then led through a non-ferrous metal concentrator 42 as described hereinabove.

The metallic concentrate which has been separated out may then be passed through an eddy current aluminum separator 44 such as that of our U.S. Pat. No. 4,069,145 in which the particles are electromagnetically treated with the result that an aluminum product, often of at least 95% purity, is obtained at usually greater than 90% recovery when the aluminum content of the solid waste is a nominal 0.5 to 1.0% by weight.

DESCRIPTION OF THE PREFERRED EMBODIMENT

According to the preferred embodiment of our invention an input feed stream of muncipal waste which has been subjected to homogenization and magnetic separation and which originally contained 1% by volume electrical conductors in the form of metal beverage containers and food cans mixed with poor or non-conductors such as paper, rocks, ceramics, linen and yard trimmings, moves horizontally via a conveyor. At the output end of the conveyor mixed metals and non-conductors fall from the conveyor onto a slide angled at about 45 degrees from vertical. The slide supports a number of detector coils arranged horizontally across the back of the slide. Each detector coil is in close proximity to an associated air nozzle. The feed material passes down the slide until a segment of material containing a conductor passes within a preset range of the detector coil. At this time the detector coil triggers the air valve for approximately 20 milliseconds, producing a pulse of air which exits from the nozzle perpendicular to the slide face. The air blast is constrained to a defined region by use of the nozzle (for example, 6 inches diameter). The air blast removes a plug of material approximately 6 inches in diameter and length corresponding to the bed depth of the feed material. The volume of material removed by the air pulse is maintained at an amount which insures that the percentage of conductor in the extracted material is higher than in the input feed stream. We have found that 150 p.s.i. air pressure applied through a commercially available air valve can produce separation velocities of 8 ft/sec to 15 ft/sec constrained to within 25 degrees from a line perpendicular to the slide face. Air requirements based on a 1000 ton per day input feed at 0.5% aluminum content are nominal. A volume reduction of 90% is obtained when the detector is set to reject ferrous conductors.

For another system of detection, see U.S. Pat. No. 2,045,769.

While the invention has been described in terms of preferred embodiments, the claims appended hereto are intended to encompass all embodiments which fall within the spirit of the invention.

Having thus described our invention and certain preferred embodiments thereof, we claim:

1. A non-ferrous metal concentrator comprising
   (1) means for feeding solid waste in the form of non-metallic particles and ferrous and non-ferrous metallic particles to a concentration zone,
   (2) in continuity with said means for feeding a slide for receiving said solid waste into and conducting said solid waste through said concentration zone,
   (3) in conjunction with said slide a phase-lock loop detection circuit comprising a plurality of detector coils,
   (4) an electronic activation system in association with said slide,
   (5) a pneumatic particle remover positioned so as to be activated by said electronic activation system, said pneumatic particle remover including
      (a) an air line from an air source, and
      (b) an air valve and a jet-type spray unit connected to said air line,
   (6) a non-metallic residue conveyor positioned to receive non-metallic particles from said slide,
   (7) a metallic concentrate conveyor positioned to receive principally non-ferrous metallic particles caught by said jet-type spray unit, and
   (8) a splitter separating said non-metallic residue conveyor and said metallic concentrate conveyor, said phase-lock loop detection circuit and electronic activation system comprising a detector coil drive circuit, detector coil and output frequency filter, amplifier and time-delay circuit whereby a feedback loop is formed to enable the coil to be driven at the natural electrical resonant frequency of detector coil inductance and parallel tank circuit capacitance and whereby said phase-lock loop detection circuit produces an error signal which, after being amplified and high pass filtered, is used to activate said air valve.

* * * * *